United States Patent
Paduano et al.

(10) Patent No.: US 6,698,969 B2
(45) Date of Patent: Mar. 2, 2004

(54) ADJUSTABLE STEERING TIE ROD WITH HELICAL LOCKING DEVICE

(75) Inventors: Enzo Paduano, São Bernardo Do Campo-São Paulo (BR); Joao Garcia, São Bernardo Do Campo-São Paulo (BR)

(73) Assignee: Dana Industrial S/A, Sao Paulo (BR)

( * ) Notice: Subject to any disclaimer, the term of this patent is extended or adjusted under 35 U.S.C. 154(b) by 0 days.

(21) Appl. No.: 10/098,288

(22) Filed: Mar. 18, 2002

(65) Prior Publication Data

US 2002/0130478 A1 Sep. 19, 2002

(30) Foreign Application Priority Data

Mar. 16, 2001 (BR) .............................. 0101186

(51) Int. Cl.⁷ .............................. B62D 7/00; F16B 1/00
(52) U.S. Cl. ................. 403/373; 403/374.3; 403/109.4; 403/344; 280/93.51
(58) Field of Search ......................... 403/374.1, 374.2, 403/374.3, 373, 377, 378, 344, 109.4; 411/71–74, 453; 280/93.51

(56) References Cited

U.S. PATENT DOCUMENTS

| | | | | |
|---|---|---|---|---|
| 850,980 A | * | 4/1907 | Stulz ........................ 411/71 X |
| 2,120,577 A | * | 6/1938 | Schulte ........................ 411/71 |
| 5,441,372 A | * | 8/1995 | Wilkinson ................. 411/72 X |
| 5,749,692 A | * | 5/1998 | Kish et al. ................... 411/453 |
| 6,074,125 A | * | 6/2000 | Krawczak ................. 403/374.3 |
| 6,579,025 B1 | * | 6/2003 | Sokolihs et al. |
| 6,604,887 B2 | * | 8/2003 | Carreira ....................... 403/373 |
| 2002/0136596 A1 | * | 9/2002 | Mouro |

* cited by examiner

Primary Examiner—Lynne H. Browne
Assistant Examiner—Ryan M. Flandro
(74) Attorney, Agent, or Firm—Liniak, Berenato & White

(57) ABSTRACT

An adjustable steering tie rod assembly having a steering terminal with a threaded rod connected to a tube having an annular cavity and an intermediate tubular member. The intermediate member has an internal helical thread and an external thread. The threaded steering terminal, the intermediate member and the tube are connected in a concentric arrangement. The internal and external threads of the intermediate member allow adjusting the length of the assembly without axial movement of the intermediate member. The bracketing mechanism is designed to assure that the three components are adequately fixed and form a solid assembly. The helical threads of the intermediate member are thrust on the external thread of the rod of the steering terminal and internal thread of the tubular extremity of the steering tie rod to provide security. The intermediate member is provided with a helical cutting on its internal thread in an opposite direction relative to said thread, and another helical cutting on its external thread in an opposite direction relative thereto. The arrangement provides for locking the assembly and hinders the spontaneous rotating movement of the components.

8 Claims, 1 Drawing Sheet

ADJUSTABLE STEERING TIE ROD WITH HELICAL LOCKING DEVICE

BACKGROUND OF THE INVENTION

1. Field of the Invention

This invention relates to steering tie rods and an improved adjusting mechanism and is more particularly related to adjusting the length of the steering tie rod in a millimetrical way, without disassembly, in order to adjust the grade of toeing-in or toeing-out for the front wheels of a vehicle.

2. Discussion of the Related Art

Steering tie-rods conventionally employ a regulating rod, for which it is provided a cap, having a left internal thread at one side and a right internal thread at the other side, on which steering terminals are assembled. Adjustment is obtained through the rotation of this sleeve toward an appropriate direction, and a pair of brackets, as well as screws and fixing nuts are used for obtaining a perfect fixing.

This arrangement has the disadvantage of requiring such fixing systems (brackets, screws and nuts), one for each extremity of the sleeve, thus requiring a larger space, increasing the extension and making difficult the utilization of this system in some cases, besides the need of working in a larger space and rendering difficult the use of the tool in a reasonable time and fixing of the steering tie-rod in the vehicle.

Another form utilized is the employment of an intermediate member having internal and external threads. Regulation is obtained through the rotation of this member towards the appropriate direction.

This arrangement has the disadvantage of displacing this member in the axial direction, weakening the portion of the coupling and thus diminishing safety, which normally is assured by rigid control of the intermediate member assembling.

SUMMARY OF THE INVENTION

This invention eliminates all the previously mentioned inconveniences, as it allows regulation of the geometry of the front wheels in any configuration, and in view of occupying an extremely reduced space, allows regulation within the small space because of the same preceding reason and maintains the rigidity required for the safety of the users of automotive vehicles, as it locks the threaded pieces, after the regulation, through a helical cutting made internally and externally in the inverse direction of the threads of the regulating member, and prevents the spontaneous rotating movement of the pieces between themselves, regardless of the geometry of the steering tie-rod.

BRIEF DESCRIPTION OF THE DRAWINGS

The invention will be better understood by elucidation through an example of embodiment, described as follows, with references to the attached drawings, which show.

DETAILED DESCRIPTION OF THE PREFERRED EMBODIMENTS

Figure 1A:
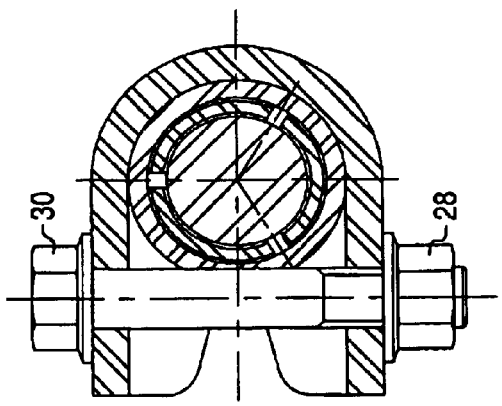
FIG. 1A, is a partial sectional view of the steering tie rod according to the present invention.
Figure 3:
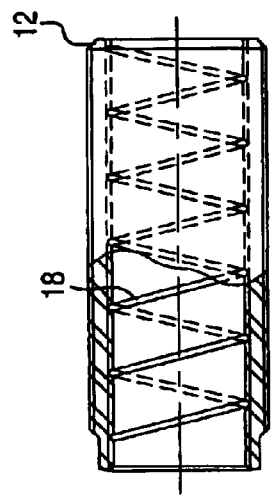
FIG. 3 is a partial sectional internal view of the intermediate regulating member.
Figure 1B:
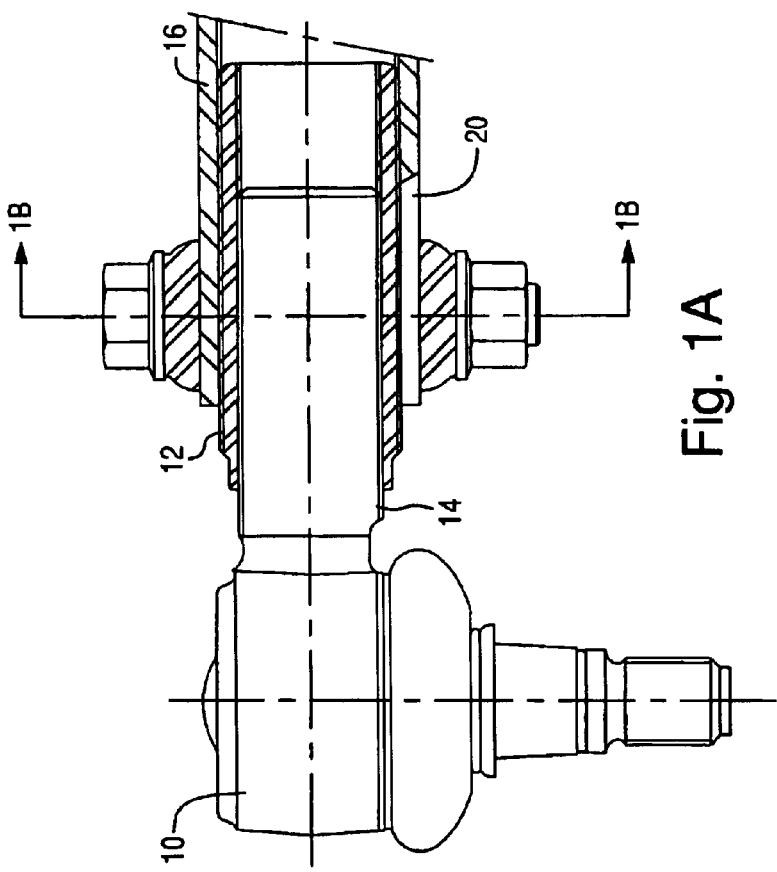
FIG. 1B is a cross sectional view taken along line 1B—1B of the steering tie rod of FIG. 1A.
Figure 2:
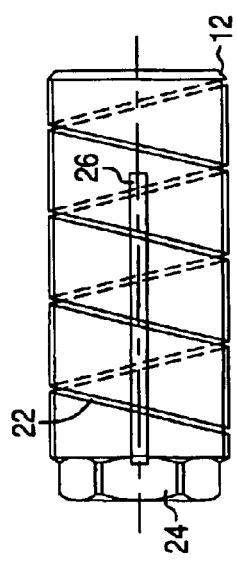
FIG. 2 is an external view of an intermediate regulating member of the tie rod of the according to the present invention.

The assembly of FIG. 1 includes a steering terminal (10) mounted on the extremity of the steering tie-rod (16), through a regulating member (12). The steering terminal (10) connects to the steering arm of an axle journal of the front wheel of the vehicle.

The regulating member (12), according to this invention, provides a mechanism for regulation of the extension of the steering tie-rod (16), with the purpose of regulating the convergence or the divergence of the front wheels of a vehicle.

The steering terminal (10), includes a threaded region (14) in its extremity. This thread is normally with pitch to the right. The tubular extremity of the steering tie-rod (16) has an axially extended slit (20). An intermediate member (12) with tubular construction having in its internal profile a right pitch thread, that corresponds to the thread (14) of the steering terminal (10), and in the inverse direction, namely, with left pitch, a helical cross section (18) that has the function of locking the intermediate member (12) against the threaded region (14) of the steering terminal (10), impeding spontaneous rotation relative to the intermediate member (12). The intermediate member (12) is provided with a hexagonal profile (24). A part of the intermediate member (12) is closed to form an axially extended slit (26) aiming also to lock and avoid spontaneous rotation of the intermediate member (12) relative to the tubular extremity of the steering tie-rod (16). On the external thread of the intermediate member (12) a helical cutting (22) in the inverse direction of the thread is provided.

For better clarification, we describe below the operation of the adjustable system of steering tie-rod.

The intermediate member (12) is encased in the tubular extremity of the steering tie-rod (16) and the steering terminal (10) is threaded in the intermediate member (12) in a concentric coupling. When a regulation in the total length of the steering tie-rods (16) is desired, a tool is utilized through the hexagonal part (24) rotating the intermediate member (12).

This axial displacement causes reduction or increasing in the extension of the steering tie-rod (16), depending on the direction in which the intermediate member (12) is rotated. After the adjustment is made, the nut (28) of the screw (30) that fastens the bracket is fixed, causing a solidary fixing through the compensation of clearances caused by the reduction of the slits (20) and (26) in their width. When the nut (28) of the bracket is tightened, an accidental rotation of the intermediate member (12) is prevented by the locking of the cutting (18) anticipated over the internal thread existent in the intermediate member (12), and in the inverse direction of it, and also by the helical cutting (22) anticipated over the external thread of the intermediate member (12), and in the inverse direction of the latter, what will hinder the spontaneous rotation of the pieces between themselves, namely, steering terminal (10), intermediate member (12) and tubular extremity of the steering tie-rod (16), maintaining the regulation applied on the assembly always fixed.

In short, the adjustment of the steering tie-rod, according to this invention, is simple in construction and by access to the fastening screw (30) and fixing nut (28), facilitated by its relative position, by its extremely compact construction, and by its reliability in view of the non-existence of spontaneous rotation of the pieces between themselves, having in view the locking system provided by the helical cuttings (18) and (22).

What is claimed is:

1. An adjustable steering tie-rod, with a helical locking device, comprising: a steering terminal having an external threaded region on a rod portion thereof, the rod portion being coupled in an interior of an intermediate member with and external threads of said intermediate member and external threads, said threading having pitches opposite to each other, said intermediate member being coupled in a tubular extremity of the steering tie-rod, said tubular extremity having internal threads, wherein the intermediate member is provided with a helical cutting on its internal thread in an opposite direction relative to said thread, and another helical cutting on its external thread in an opposite direction relative thereto.

2. The adjustable steering tie-rod according to claim 1, further comprising a bracket provided to lock the steering terminal, intermediate member and tubular extremity of the steering tie-rod, said internal and external threads of the intermediate member provided to hinder spontaneous rotation of the steering terminal, intermediate member and tubular extremity of the steering tie-rod.

3. An adjustable tie rod assembly comprising:

a tie rod member having a first tubular portion;

a steering terminal member having a second tubular portion with an external threaded portion at least partially disposed within said first tubular portion of said tie rod member; and an intermediate tubular member disposed between said tie rod member and said steering terminal member, said intermediate tubular member having internal helical threads engaging said external threaded portion of said steering terminal member whereby relative rotation of said steering terminal member relative to said intermediate regulating tubular member facilitates an adjustment of an overall length of said tie rod assembly, said intermediate tubular member further including a first helical cutting provided on said internal helical threads, said first helical cutting extending in a direction inverse to a direction of said internal threads; and a locking bracket disposed about said tie rod member to lock said tie rod member, said steering terminal member and said intermediate tubular member in a fixed relative position.

4. The adjustable tie rod assembly according to claim 3, wherein said intermediate tubular member further includes:

external helical threads running in a direction opposite to said internal helical threads and engaging internal threads formed on said first tubular portion; and a second helical cutting provided on said external helical threads, said second helical cutting extending in a direction inverse to a direction of said external threads.

5. The adjustable tie rod assembly according to claim 4, wherein said intermediate tubular member comprises at least one axially extended slit.

6. The adjustable tie rod assembly according to claim 5, wherein first tubular portion of said tie rod has a second axially extended slit.

7. The adjustable tie rod assembly according to claim 6, wherein said first tubular portion of said tie rod has internal threads engaging said external helical threads of said intermediate tubular member.

8. The adjustable tie rod assembly according to claim 5, wherein said locking bracket includes:

a first portion substantially circumscribing said first tubular portion of said tie rod member;

an adjustable bolt extending through said first portion wherein when said adjustable bolt is tightened, said first portion constricts about said first tubular portion of said tie rod and thereby locks said tie rod member, said intermediate tubular member and said steering terminal member in a fixed position.

* * * * *